Dec. 22, 1925.　　　　　　　　　　　　　　　　1,566,559
E. J. PRIME
ANTISKIDDING ATTACHMENT
Filed May 11, 1925　　　　2 Sheets-Sheet 1
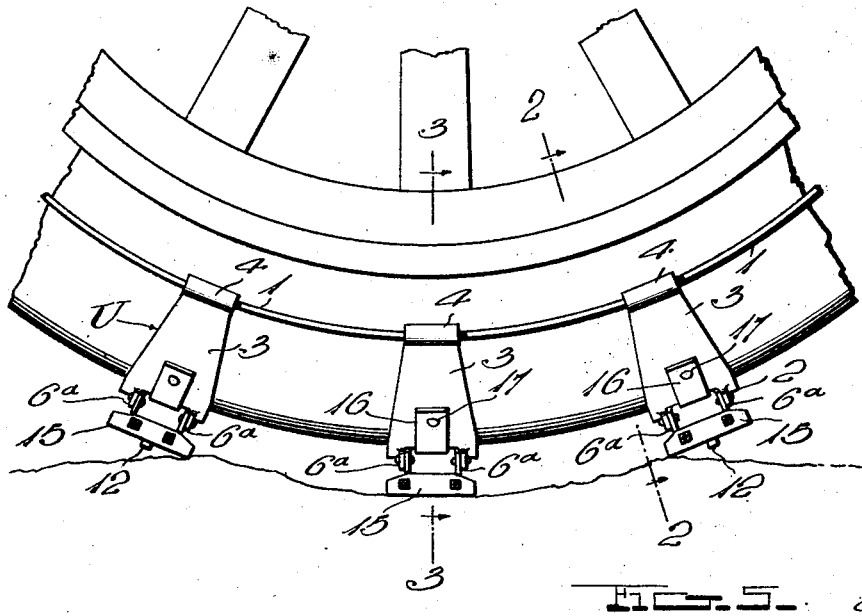
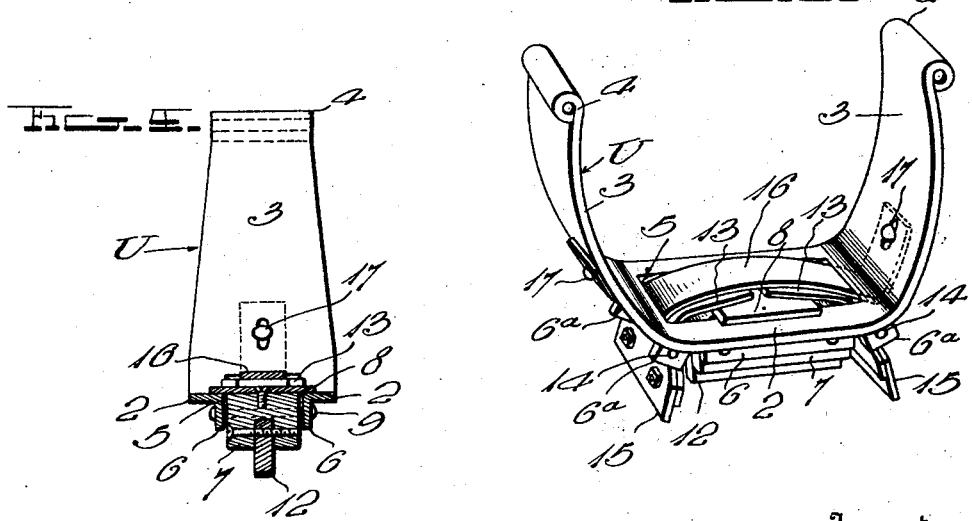
Witness
H. Woodard
Inventor
E. J. Prime
By H. R. Williston &co
Attorneys

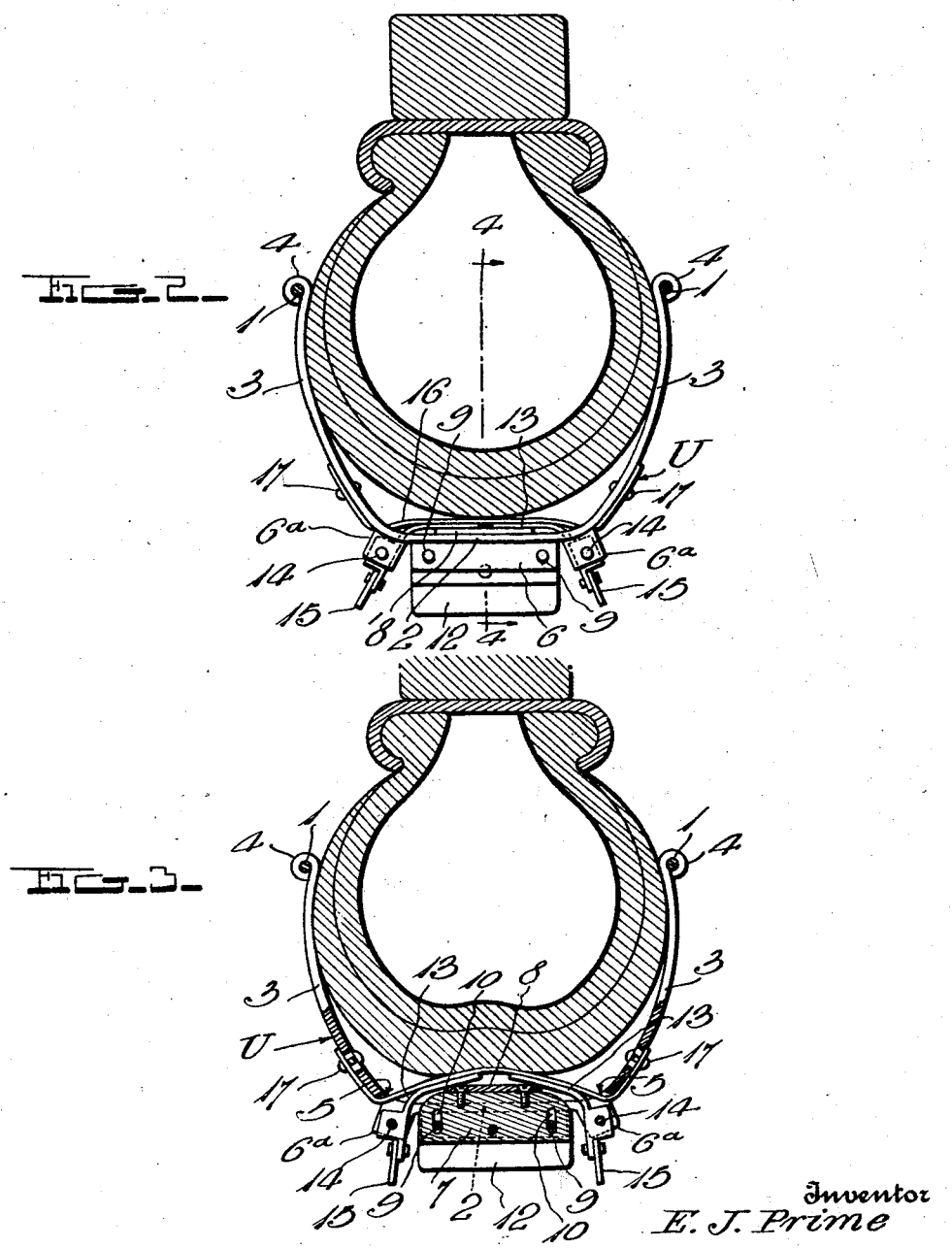

Patented Dec. 22, 1925.

1,566,559

UNITED STATES PATENT OFFICE.

EDWARD J. PRIME, OF GROVELAND, MASSACHUSETTS.

ANTISKIDDING ATTACHMENT.

Application filed May 11, 1925. Serial No. 29,577.

*To all whom it may concern:*

Be it known that I, EDWARD J. PRIME, a citizen of the United States, residing at Groveland, in the county of Essex and State of Massachusetts, have invented certain new and useful Improvements in Antiskidding Attachments; and I do declare the following to be a full, clear, and exact description of the invention, such as will enable others skilled in the art to which it appertains to make and use the same.

My invention relates to improvements in anti-skidding and traction attachments for automobile wheels, and its object is to provide a device of this character which will be very efficient when a machine must be driven over snow, ice or mud, or even over slippery streets.

With the foregoing in view, the invention resides in the novel subject matter hereinafter described and claimed, the description being supplemented by the accompanying drawings.

Figure 1 is a fragmentary side elevation showing the application of the invention to an automobile wheel.

Figures 2 and 3 are transverse sectional views on lines 2—2 and 3—3 of Fig. 1.

Figure 4 is a sectional view as indicated by line 4—4 of Fig. 2.

Figure 5 is a perspective view of one unit of the device.

The attachment is in the nature of a band to surround the tire of an automobile wheel, and at circumferentially spaced points, this band carries road grippers and road-engaging shoes for operating said grippers.

In the preferred construction, herein disclosed, two cables are provided for disposition at opposite sides of a tire, said cables being indicated at 1, and secured at spaced points to these cables, are traction units U. Each of these units preferably comprises a tread bar 2 to extend transversely of the wheel tire, the ends of said tread bar having integral inwardly extending arms 3 which are adapted to straddle the tire, the free ends of said arms being provided with loops 4 which surround the cables 1.

The tread bar 2 is formed with a longitudinal slot 5 and with downwardly bent flanges 6—6ª along the edges of said slot. A road-engaging shoe 7 is received in the slot 5 between the flanges 6, for sliding radially with respect to the wheel on which the invention is used. This tread shoe may well have a plate 8 secured to its inner side to contact with the inner side of the bar 2 and limit the outward movement of the shoe, and to assist in properly guiding said shoe as it moves inwardly and outwardly, pins 9 preferably extend between the flanges 6 and pass through slots 10 in said shoe. A detachable calk 12 is preferably provided for the shoe 7 and may be replaced by a new calk when worn.

Angular levers 13 pass loosely through the ends of the slot 5 and are fulcrumed at 14 between the flanges 6ª, the outer ends of said levers being disposed at the ends of the shoe 7 and having jaw plates 15 which are preferably secured detachably in place. The inner ends of the levers 13 lie between the plate 8 and a flat spring metal strip 16, the ends of the latter passing through the ends of the slot 5 and being connected at 17 to the arms 3. This spring normally rocks the levers 13 to hold their inner ends against the plate 8 and the jaws 15 spaced outwardly from the shoe 7, as seen in Fig. 2, but when a wheel, equipped with the invention, is driven, contact of the shoes 7 with the roadway will cause inward radial sliding of said shoes, thus rocking the levers 13 and causing the jaws 15 to grip the roadway, as in Fig. 3, so that effective traction and non-skidding qualities will result, regardless of the condition of the road.

The details disclosed are preferably followed, but within the scope of the invention as claimed, modifications may of course be made.

I claim:

1. A traction and non-skidding attachment for a vehicle wheel, comprising a band to surround the wheel, road grippers movably mounted at circumferentially spaced points on said band, and gripper-applying shoes movably mounted on the band and operatively connected with the grippers.

2. A traction and non-skidding attachment for a vehicle wheel, comprising a tread bar to extend transversely of a tire, arms extending from the ends of said tread bar and adapted for disposition at opposite sides of the tire, a tire-engaging spring extending between and connected to said arms, means associated with said arms for securing said tread bar and arms in fixed relation with the tire, road grippers movably connected with the end portions of the tread bar and having operating portions between the latter and said spring, and a shoe slidably carried by said tread bar for radial movement, said shoe engaging said operating portions of said grippers to operate the latter when the shoe moves inwardly.

3. A structure as specified in claim 2; said grippers comprising levers having jaws at their outer ends, said tread bar having a slot in which the levers are fulcrumed and through which said shoe passes slidably.

In testimony whereof I have hereunto affixed my signature.

EDWARD J. PRIME.